United States Patent Office 3,169,939
Patented Feb. 16, 1965

3,169,939
HALOMETHYLATED DIARYLOXIDES AS CATALYSTS FOR CURING PHENOL- AND UREA-FORMALDEHYDE-TYPE RESINS
Howard P. Cordts, Bay City, and James D. Doedens, Midland, Mich., assignors to The Dow Chemical Company, Midland, Mich., a corporation of Delaware
No Drawing. Filed July 25, 1960, Ser. No. 44,895
11 Claims. (Cl. 260—38)

The present invention concerns halomethylated diaryloxides as latent catalysts for curing phenol- and urea-formaldehyde-type resins. Small quantities of the halomethylated diaryloxides are incorporated into compositions comprising a phenol- or urea-formaldehyde-type resinoid and a filler and are subsequently thermally activated to cure the resinoid in situ.

It is a common practice whenever acid-hardenable phenol-formaldehyde or urea-formaldehyde-type resins are employed as binders for molding compositions to cure the resinoids of these resins in situ by subjecting the composition to higher temperatures and an atmosphere of a catalytic acid gas. Such procedures are inconvenient due to the necessity of providing means for confining the extremely toxic acid gas catalysts and for supplying the acid gas in an anhydrous condition in order to minimize corrosion of equipment. Such procedures are also inefficient as a result of inherent limitations on the diffusivity of the acid gas catalyst within the interstices of the resin-containing body. Due to varying thicknesses in certain areas of the formed body and the relative inaccessibility of the catalytic gas thereto, the extent of catalysis, and therefore the character or quality of the resulting cure is not uniform.

An object of the present invention is to provide a novel catalyst for phenol- and urea-formaldehyde-type resins and particularly to provide a resin-catalyst system that can be conveniently utilized with exceptional advantage to bind any of a wide variety of fillers. Further objects are to provide relatively non-hazardous, non-corrosive and conveniently controlled and applied catalyst materials for the curing of acid-hardenable phenol- and urea-formaldehyde-type resins. Still further objects involve providing a cured phenol-formaldehyde or urea-formaldehyde resin that is characterized by improved strength and resistance to water and alkalies. Other objects of the invention will become apparent hereinafter as the invention is more fully described.

In accordance with the present invention, it has been discovered that exceptionally efficacious results are obtained in the formulating, molding and curing of acid-hardenable phenol-formaldehyde, urea-formaldehyde and related resins by incorporating a catalytic quantity of a halomethylated diaryloxide into the resin or the composition in which it is employed.

The halomethylated diaryloxides of the invention are to be construed as being inclusive of the chloro and bromo derivatives. They may be mono- or polyhalomethylated and they may be employed as individual compounds or as mixtures. While dinaphthyloxides, bis(biphenyl)oxides and the like symmetrical aromatic ethers and unsymmetrical ethers such as tolylphenyloxide and operable, diphenyloxide is preferred for the bis-aromatic ether nucleus. Halomethylated diphenyloxides as prepared in accordance with current manufacturing techniques such as are disclosed in United States Letters Patent 2,911,380, are usually obtained as mixtures containing varying proportions of the mono-, di-, tri- and tetrahalomethylated diphenyloxides, together with minor proportions of unreacted diphenyloxide.

Such halomethylated diaryloxides can be prepared by reacting a halomethylating agent as, for example, methyl-chloromethyl ether, bis(chloromethyl) ether or a mixture of formaldehyde and hydrogen chloride with a diaryloxide such as diphenyloxide, ditolyloxide and the like aromatic ethers, in the presence of a catalyst for the reaction such as zinc chloride, aluminum chloride, ferric chloride, borontrifluoride and the like.

Mono- or polyhalomethylated diaryloxides or mixtures thereof are thus prepared depending upon the proportion of halomethylating agent employed, the extent of the halomethylation reaction and on whether steps are taken to separate and purify an individual halomethylated aromatic ether product.

Specific examples of halomethylated diaryloxides that can be separated from the reaction products prepared as just described are mono-(chloromethyl) diphenyl oxide, di-(chloromethyl) diphenyl oxide, tri-(chloromethyl) diphenyl oxide, tetra-(chloromethyl) diphenyl oxide, mono-(bromoethyl) diphenyl oxide, di-(bromomethyl) diphenyl oxide, mono-(chloromethyl) ditolyl oxide, di-(chloromethyl) ditolyl oxide, mono-(bromomethyl) ditolyl oxide, etc.

While any halomethylated diaryloxide product can be resolved into its individual constituents for the separate employment thereof, it has been found that the mixtures of the halomethylated diaryloxides can be employed in the invention to great advantage. The mixtures generally employed in the invention contain major proportions of di- and trihalomethylated diaryloxides and lesser proportions of the mono- and tetrahalomethylated diaryloxides.

A convenient means of indicating the extent of halomethylation and consequently the potential catalytic activity of the composition for the purposes of the invention utilizes the halogen content of the combined halomethylated aromatic ether product.

The resins employed in the invention are of the group of acid-hardenable, that is, cured with the aid of acid catalysts, phenol-formaldehyde-type and urea-formaldehyde-type resinoids, that are characterized by solubility in aqueous or organic solvents and by curability upon being subjected to the action of acid catalysts and higher temperatures to provide insoluble, infusible thermoset resins.

The terminology "phenol-formaldehyde-type" encompasses resoles and resitols, i.e., phenolic resins in either "A" or "B" stages. Such resins are the initial condensation products obtained by reacting a phenolic material with an aldehyde. The class of phenolic materials includes, for example, phenol, resorcinol, m-cresol, 3,5-xylenol, m-chlorophenol and the like cross-linkable phenolics. Such phenolic materials can also be employed as mixtures that may contain minor proportions of non-cross-linking phenolics such as ortho- and para-cresols, 2,5-xylenol, ortho-chlorophenol and the like. Aldehydes include formaldehyde or a similarly acting material such as gaseous formaldehyde, paraformaldehyde, trioxymethylene, hexamethylenetetramine, acetaldehyde, furfuraldehyde and the like aldehydes.

The terminology "urea-formaldehyde-type" encompasses the initial acid or base catalyzed water-soluble condensation products of urea or similar compounds such as melamine with an aldehyde such as formaldehyde or a similarly acting material such as gaseous formaldehyde, paraformaldehyde, trioximethylene, hexamethylenetetramine, acetaldehyde, furfuraldehyde and the like.

Detailed procedures for preparing the intermediate acid-hardenable resinoids described above are well known in the art. For example, the subject is extensively treated in Ellis, The Chemistry of Synthetic Resins, volume 1, Reinhold Publishing Corp., New York, New York (1935), wherein detailed methods for the preparation of the phenol-formaldehyde and urea-formaldehyde-type resins are set forth in Chapters 13–22, pages 277–488, and Chapters 26–30, pages 564–649, respectively.

When employed in accordance with the invention, these resinoids provide highly efficacious binders for any of a wide variety of fillers in molding compositions. The resinoids are cured in situ by incorporating catalytic quantities of a halomethylated diaryloxide or mixture thereof into the resinoid prior to its utilization in a molding composition or into a molding composition containing the resinoid and subsequently thermally activating the resin-catalyst system in situ within the formed body of the molding composition.

While there is some tendency for the acid gas to slowly evolve at room temperatures thus causing a premature partial curing of the resin, good results are realized in the practice of the invention after latency periods during which the resinoid and halomethylated diaryloxide are in mutual association of at least one day and frequently after periods of one week. Since this tendency to partially cure at normal temperatures is directly proportional to the quantity of the halomethylated diaryloxide catalyst employed, it is desirable to employ as little of such catalyst as is required to adequately catalyze the curing of the resinoid. Thus, although greater quantities can be used effectively, it is preferable to employ from about 0.3 to about 20 percent of the halomethylated diaryloxide catalyst based on the weight of the resin.

Resins that have been cured in accordance with the invention are exceptional binders for organic fillers as, for example, cellulosic derivatives such as wood flour, walnut shell flour, cottonseed hulls, cotton flock, wood cellulose, sisal fiber, paper, chopped paper, diced resin board, textiles and textile by-products such as macerated fabrics, lignin and the like. Also, proteinaceous fillers such as soy bean meal and keratin and carbonaceous fillers such as graphite, carbon black and the like are other organic fillers often used. Inorganic fillers frequently employed include asbestos, mica, diatomaceous silica, glass fibers, sand, barium sulfate, lead oxide and the like inorganic fillers.

Having obtained a desired resinoid and filler combination, the filler is coated with a quantity of the resinoid sufficient to provide, depending upon the type of application, from about 5 to 50 percent or more of the resin based on the weight of the total composition. The coating step is accomplished by any convenient means and is often carried out either by directly mixing an aqueous or organic solvent solution of the resinoid with the filler to be coated or by spraying the solution on the surface of the filler. Usually, at the same time that the coating operation is carried out, a quantity of the halomethylated diaryloxides of the invention is also incorporated into the aqueous or organic solvent solutions of the resinoid in an amount sufficient to provide the desired potential catalytic activity. The catalytic quantities of the halomethylated diaryloxides may also be mixed directly with the resin-filler composition in the form of aqueous dispersions prior to the forming operations.

The molding compositions containing both a resin and catalyst of the invention have a shelf life of at least one day and often, depending upon the quantity of the catalyst employed and the particular resinoid employed, the molding composition will have a shelf life of several days before the extent of premature curing is sufficient to have a depreciating effect on the ultimately molded product. After molding or otherwise shaping a body of the molding composition in a desired manner, the body thus prepared is subjected to curing temperatures from about 40° to about 250° C., and preferably about 65° to about 150° C. for a period of time sufficient to accomplish the in situ cure of the resinoid employed.

Due to the intimate and uniform distribution of the catalytic product of the invention throughout the molding composition and its proximity to the resinoid in situ within the molded composition, the period of time required to accomplish a complete cure is seldom greater than 10 minutes and is often less than 5 minutes.

The following examples are given as further illustrations of the invention and the invention should not be construed as being limited thereto.

EXAMPLE 1

A foundry sand composition was prepared from 400 grams of a conventional foundry sand, 9.5 grams of a urea-formaldehyde resin composition containing 60 percent by weight of an initial water-soluble condensate of urea and formaldehyde consisting of 2 moles of formaldehyde for each mole of urea, 30 percent by weight of free urea and 10 percent by weight of water, and 0.5 gram of chloromethylated diphenyloxide (CMDPO) having 16.9 percent combined chlorine. The CMDPO employed was a mixture of about 17.3 percent diphenyloxide, 48.2 percent monochloromethyl diphenyloxide, 31.4 percent di-(chloromethyl) diphenyl oxide, 2.3 percent tri-(chloromethyl) diphenyl oxide and 1.0 percent tetra-(chloromethyl) diphenyl oxide. The CMDPO was added to the resin composition and this mixture was then added to the sand. After thorough mixing of the foundry sand composition to insure complete coating of the sand, 100 grams of the sand mixture was placed in a 1 inch dog bone mold such as that described at page 91 in Foundry Sand Testing Handbook, 5th Edition, American Foundrymen's Association, Chicago, Illinois (1944) and cold pressed under 5000 p.s.i. The briquette thus prepared was then removed from the mold and cured at 150° C. for 5 minutes. In evaluating the physical properties of the cured briquette, tensile strength tests were made on a Railley tensile machine and surface hardness tests were made with a Dietert hardness tester. Subsequently, other foundry sand compositions containing varying quantities of CMDPO and the urea-formaldehyde composition as specified in the following table were prepared and cured in accordance with the foregoing method and similarly tested. The results for all runs are reported in the following table:

Table 1

| Grams CMDPO | Grams Urea-Formaldehyde Resin | Cure Achieved | Tensile Strength, p.s.i. | Surface Hardness |
|---|---|---|---|---|
| 0.5 | 9.5 | Yes | 213 | 96 |
| 0.25 | 9.75 | Yes | 225 | 95–96 |
| 0.1 | 9.9 | Yes | 212 | 92 |
| 0.05 | 9.95 | Yes | 185 | 94 |
| 2.0 | 8.0 | Yes | 203 | 95 |
| 0.0 | 10.0 | No | ------ | ------ |

EXAMPLE 2

A urea-formaldehyde resin employed for improving the wet strength of paper and paper products was prepared from 200 parts urea, 678 parts of 37 percent formalin and 7.5 parts triethanolamine. These ingredients were mixed together and heated to 70° C. for 30 minutes after which 20 parts of tetraethylenepentamine, 47 parts water and 55.7 parts 18 percent hydrochloric acid were added to the reaction mixture. The resulting mixture was then maintained at about 70–75° C. for one hour during which period the pH dropped to about 1.6–2.0. The pH was then adjusted to 3 by the addition of sodium hydroxide solution. When the viscosity had reached a point within the range from about 100–300 centipoises at 25° C., the resin was neutralized with caustic solution. Quantities of the above-prepared resin containing various concentrations of CMDPO were subjected to a stroke cure test to determine their cure characteristics and the storage stability of the CMDPO-containing resins.

In the stroke cure test, an electric hot plate was maintained at 200° F. A 1 gram sample of the catalyzed urea-formaldehyde resin was placed on the hot plate and stroked back and forth with a metal spatula. When the resin cured, the time was noted and recorded as a cure time at 200° F. The cure times for the following listed examples were in the range of from 30 to 40 seconds at 200° F.

The effect of varying the combined halogen contents and the percentage of the catalyst employed on the period of storage stability is shown in the following table. It is to be understood that the CMDPO listed according to its halogen content is a mixture of mono-, di-, tri- and tetra-(chloromethyl) diphenyl oxide with a predominant portion of the combination being the di- and trichloromethyl derivatives.

Table 2

| CMDPO (Percent Combined Chlorine) | Percent CMDPO in Resin | Days Stability |
|---|---|---|
| 17.3 | 1.0 | 4 |
| 17.3 | 2.5 | 4 |
| 17.3 | 5.0 | 2.5 |
| 17.3 | 10.0 | 2.5 |
| 23.6 | 1.0 | 3.0 |
| 23.6 | 2.5 | 3.5 |
| 23.6 | 5.0 | 1.0 |
| 23.6 | 10.0 | 1.0 |
| 30.7 | 1.0 | 5.0 |
| 30.7 | 2.5 | 5.0 |
| 30.7 | 5 | 2.5 |
| 30.7 | 10 | 2.5 |

EXAMPLE 3

A foundry sand composition was prepared from a conventional foundry sand and 3.2 percent by weight of an acid-hardenable phenolic resole and 0.8 percent by weight of a CMDPO mixture that consisted of approximately 60 percent di-(chloromethyl) diphenyl oxide and 40 percent mono-(chloromethyl) diphenyl oxide. This mixture was thoroughly mulled by mechanical means so as to achieve a uniform coating of the resin on the sand. One hundred gram quantities of the coated sand were then formed by cold pressing the sand composition into molds as described in Example 1. The briquettes thus prepared were cured in an oven at about 80° to 85° C. for 30 minutes and subsequently subjected to tensile tests in accordance with the method of Example 1. The results obtained with this run and others in which the relative percentages of the phenolic resin and CMDPO were varied are reported in the following table.

Table 3

| Percent "B" Stage Resole | Percent CMDPO | Tensile Strength of Briquette, p.s.i. |
|---|---|---|
| 3.2 | 0.8 | 217 |
| 3.6 | 0.4 | 387 |
| 3.68 | 0.32 | 167.0 |

The catalyzed mixture of the foregoing example and that in Example 1 are highly useful in the manufacture of foundry cores, molds and the like. The resulting core or mold is uniformly cured and has greater strength than that which can be obtained by conventional acid gas catalysis of the same foundry sand composition without the inclusion of the CMDPO.

Like results are achieved in a manner similar to that of the foregoing examples by substituting a mono-, di-, tri- and tetra-(bromomethyl) diphenyl oxide, mono-, di-, tri- and tetra-(chloromethyl) tolylphenyl oxide, mono-, di-, tri- and tetra-(bromomethyl) tolylphenyl oxide, mono-, di-, tri- and tetra-(chloromethyl) ditolyl oxide, mono-, di-, tri- and tetra-(bromomethyl) ditolyl oxide and mixtures of any of the foregoing materials for the chloromethylated diphenyloxides.

We claim:
1. A composition of matter comprising an acid hardenable, thermosetting resin selected from the group consisting of intermediate condensation products of a phenol and an aldehyde, condensation products of urea and an aldehyde and condensation products of melamine and an aldehyde and a catalytic quantity of a halomethylated diaryloxide composition selected from the group consisting of diaryloxides having from 1 to 4 chloromethyl substituent groups, diaryloxides having from 1 to 4 bromomethyl substituent groups and mixtures of the foregoing.
2. A composition of matter as in claim 1 wherein the quantity of halomethylated diaryloxide employed is from about 0.3 to about 20 percent by weight of the resin.
3. A composition of matter comprising a filler, an acid hardenable, thermosetting resin selected from the group consisting of intermediate condensation products of a phenol and an aldehyde, condensation products of urea and an aldehyde and condensation products of melamine and an aldehyde and a catalytic quantity of a halomethylated diaryloxide composition selected from the group consisting of diaryloxides having from 1 to 4 chloromethyl substituent groups, diaryloxides having from 1 to 4 bromomethyl substituent groups and mixtures of the foregoing.
4. A composition of matter as in claim 3 wherein the quantity of halomethylated diaryloxide employed is from about 0.3 to about 20 percent by weight of the resin.
5. A composition of matter comprising a filler, an acid hardenable, thermosetting resin selected from the group consisting of intermediate condensation products of a phenol and aldehyde, condensation products of urea and an aldehyde, and condensation products of melamine and an aldehyde, and a catalytic quantity of a halomethylated diphenyloxide composition selected from the group consisting of diphenyloxides having from 1 to 4 chloromethyl substituent groups, diphenyloxides having from 1 to 4 bromomethyl substituent groups and mixtures of the foregoing.
6. A composition of matter as in claim 5 wherein the quantity of halomethylated diphenyloxide employed is from about 0.3 to about 20 percent by weight of the resin.
7. A composition of matter comprising a filler, an acid hardenable thermosetting intermediate condensation product of a phenol and an aldehyde and a catalytic quantity of a halomethylated diaryloxide composition selected from the group consisting of diaryloxides having from 1 to 4 chloromethyl substituent groups, diaryloxides having from 1 to 4 bromomethyl substituent groups and mixtures of the foregoing.
8. A composition of matter as in claim 7 wherein the filler is sand.
9. A composition of matter comprising a filler, an acid hardenable thermosetting intermediate condensation product of urea and an aldehyde and a catalytic quantity of a halomethylated diaryloxide composition selected from the group consisting of diaryloxides having from 1 to 4 chloromethyl substituent groups, diaryloxides having from 1 to 4 bromomethyl substituent groups and mixtures of the foregoing.
10. A composition of matter as in claim 9 wherein the filler is sand.
11. In a process which comprises the steps of mixing an acid hardenable thermosetting resin selected from the group consisting of intermediate condensation products of a phenol and an aldehyde, condensation products of urea and an aldehyde and condensation products of melamine and an aldehyde with a suitable filler and subsequently curing the resulting composition by subjecting it to an elevated temperature, the improvement which consists in incorporating into the resin-filler mixture from about 0.3 to about 20 percent by weight of the resin of a halomethylated diaryloxide composition selected from the group consisting of diaryloxides having from 1 to 4 chloro- methyl substituent groups, diaryloxides having from 1 to 4 bromomethyl substituent groups and mixtures of the foregoing.

References Cited in the file of this patent
UNITED STATES PATENTS 2,911,380   Doedens _____ Nov. 3, 1959

OTHER REFERENCES

Simonds: "Handbook of Plastics," published by D. Van Nostrand Co. (Princeton, New Jersey), 1943, page 430.

Gould: "Phenolic Resin," published by Reinhold Publishing Co. (New York), 1959, page 44.